July 22, 1969

R. R. MANDY ET AL 3,456,278

VEHICLE HEADLIGHT CLEARING SYSTEM

Filed April 14, 1966

INVENTORS.
ROBERT R. MANDY
WILLIS L. KIBLER
BY

ATTORNEY.

July 22, 1969　　　R. R. MANDY ETAL　　　3,456,278
VEHICLE HEADLIGHT CLEARING SYSTEM
Filed April 14, 1966　　　　　　　　　　　2 Sheets-Sheet 2
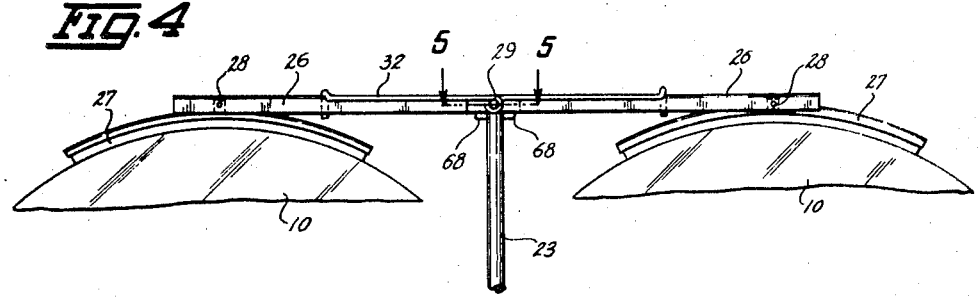
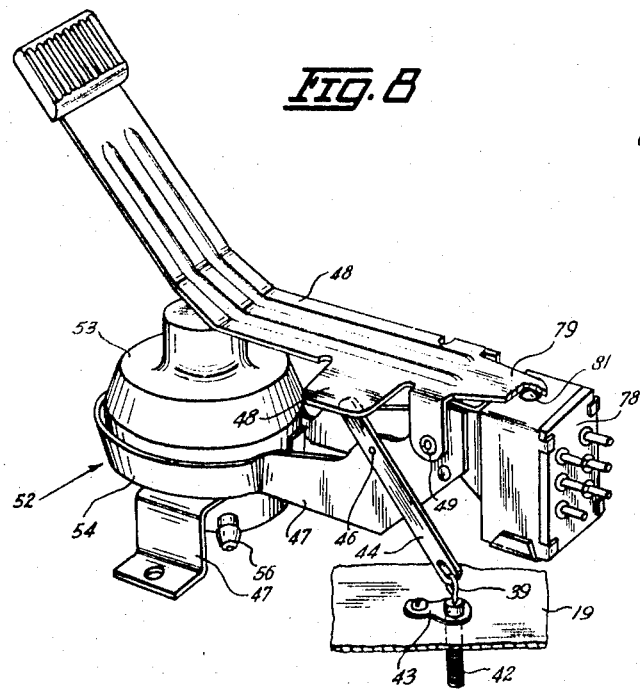
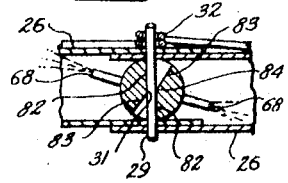
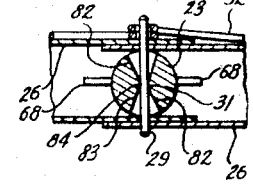
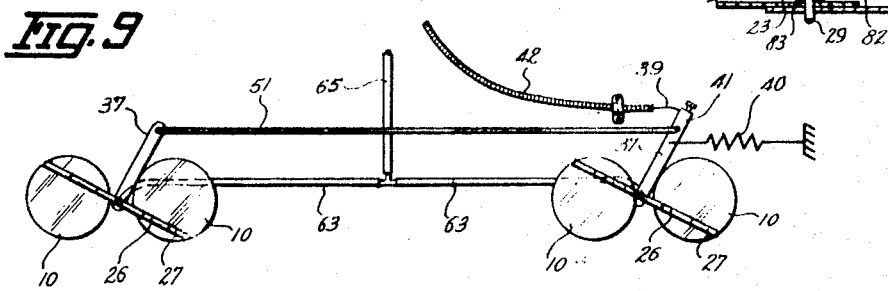
INVENTORS.
ROBERT R. MANDY
WILLIS L. KIBLER
BY
ATTORNEY.

United States Patent Office 3,456,278
Patented July 22, 1969

3,456,278
VEHICLE HEADLIGHT CLEARING SYSTEM
Robert R. Mandy and Willis L. Kibler, Detroit, Mich., assignors, by mesne assignments to McCord Corporation, Detroit, Mich., a corporation of Maine
Filed Apr. 14, 1966, Ser. No. 542,561
Int. Cl. B60s 1/66
U.S. Cl. 15—250.02    6 Claims

ABSTRACT OF THE DISCLOSURE

A headlight lens washing and wiping apparatus including a wiper mounted on a shaft adapted to oscillate over the lens. The wiper has associated therewith in lost motion relationship a spray nozzle so constructed that the spray contacts the lens in advance of the wiper. Actuating means for the apparatus is remotely positioned in the operator compartment of the vehicle.

---

This invention relates to improvements in vehicle headlight clearing systems, and is more particularly concerned with novel means for wiping the headlight lenses of a vehicle.

Heretofore, various means have been suggested for washing headlight lenses by impingement thereon of sprays of cleaning fluid. While such spraying has been reasonably effective, it is not sufficient to remove the film of road dirt which often and in many instances inevitably accumulates on the lens surface. Such film seriously clouds and reduces the light transmission through the lens.

An important object of the present invention is to provide novel wiper means for cleaning headlight lamp lenses.

Another object of the invention is to provide new and improved oscillatable lens wiping means in a vehicle headlight clearing system.

A further object of the invention is to provide improved combination headlight washing and wiping means for vehicles.

Still another object of the invention is to provide a new and improved cleaning system for dual vehicle headlights.

Yet another object of the invention is to provide new and improved means operable from the driver's compartment of a vehicle for wiping vehicle headlight lenses.

Other objects, features and advantages of the present invention will be readily apparent from the following detailed description of a preferred embodiment thereof taken in conjunction with the accompanying drawings in which:

FIG. 4 is a fragmentary side elevational view taken substantially in the plane of line IV—IV of FIG. 2;

FIG. 5 is an enlarged sectional detail view as seen along line V—V in FIG. 4;

FIGS. 6 and 7 are illustrated similarly to FIG. 5 and show the parts thereof in changed positions;

FIG. 8 is a perspective view of the combination wiper operating foot treadle and cleaning liquid pump structure which is seen in smaller detail in FIG. 1; and FIG. 9 is a schematic illustration of the coordinated dual headlight wiper mechanism of the system.

Figure 1:
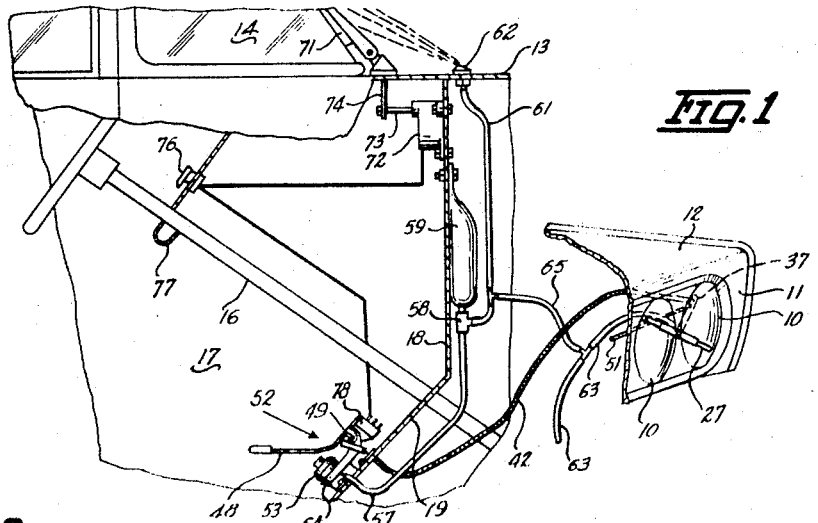
FIG. 1 is a schematic illustration of the driver's compartment portion and a fragment of the front end of a vehicle and more especially an automotive vehicle.

A headlight lens clearing system according to the present invention is adapted to be mounted operatively in association with at least one headlight having a usual convexly contoured lens 10 (FIG. 1) and mounted adjacent to one side of the front portion of a vehicle such as an automobile including a fender 11, a hood 12, a cowl 13, windshield 14, a steering column 16 within a driver's compartment 17 defined in front by a firewall 18 and having a floorboard 19, at least the forward portion thereof being inclined upwardly and forwardly.

In the illustrated arrangement (FIG. 2), dual headlights are shown mounted in a suitable supporting structure on the front of the vehicle, such as a bezel 21, with respective retainer rings 22 about the rims of the headlights. Although the headlights are shown as horizontally aligned, they may be vertically aligned, if preferred. It will be understood, of course, that whether single or dual headlights are employed, the identical arrangement is used at each side of the vehicle, as indicated schematically in FIG. 9.

Referring now to FIGS. 1–4, the headlight lens clearing system includes in respect to the headlights at both sides of the vehicle front a shaft 23 oscillatably mounted as by being journaled through a bearing 24 fixed on the mounting structure 21 through which the shaft extends alongside the headlight assembly, and in the dual arrangement desirably between the contiguous headlights. On its outer, forward end portion, the shaft 23 has mounted thereon a respective arm 26 projecting therefrom over each of the headlight lenses 10 and each arm carrying a wiper blade 27 engaging the associated lens in wiping relation. Desirably, each of the arms 26 is of channel shape, and the wiper blades have the backs thereof attached to their respective arms in a rockably articulated manner by means of respective pins 28.

Figure 2:
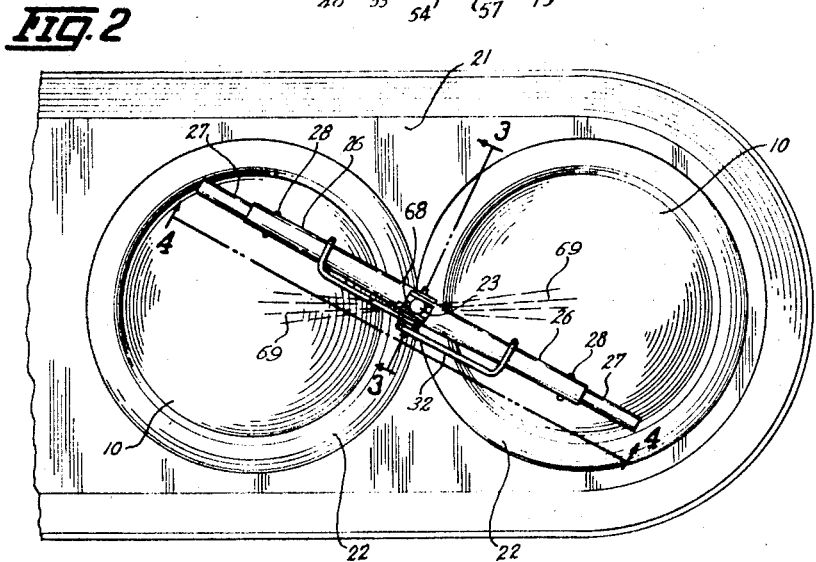
FIG. 2 is an enlarged front elevational view of one of the dual headlights of the vehicle.
Figure 3:
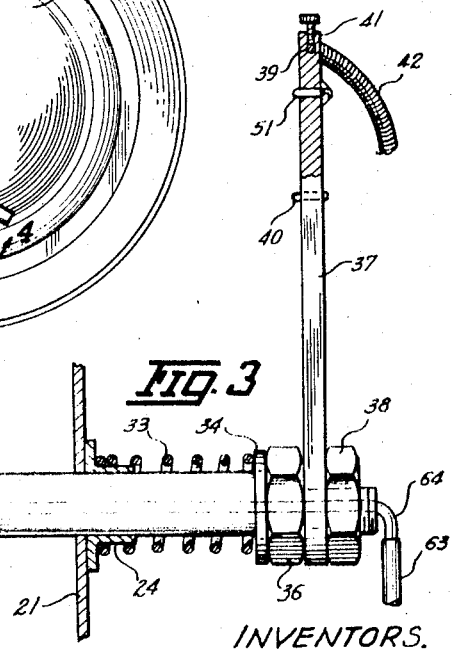
FIG. 3 is an enlarged fragmentary sectional elevational detail view taken substantially on the line III—III of FIG. 2.

To enable relative pivotal adjustment of the arms 26 in a front to rear direction while the wiper blades 27 are following the convex contours of the respective lenses 10, the adjacent end portions of the arms 26 have the side wall portions of the channels thereof disposed in overlapping relation as best seen in FIGS. 2 and 3 and relatively pivotally connected together and to the outer terminal end portion of the shaft 23 by suitable means such as a pin 29 extended through a transverse opening 31 in the shaft 23 (FIG. 5). Normally the arms 26 are biased toward the respective headlight lenses 10 by means such as a dual armed intermediately coiled, hook terminaled torsion spring 32 having its intermediate coiled portion engaged about the pivot pin 29. Bias of the spring 32 is substantially counterbalanced by a compression spring 33 coiled about the inner end portion of the shaft 23 between the bearing 24 and a shoulder on the shaft provided by a washer 34 held by a nut 36 threaded on the shaft.

Suitable means are provided for oscillating the shaft 23, and thereby the arms 26, to effect wiping strokes of the wiper blades 27 over the respective lenses 10. For this purpose each of the shafts has fixedly attached thereto a rocker arm 37. Conveniently, this is effected by keying one end portion of the rocker arm 37 to the rear end portion of the shaft 23 rearwardly from the nut 36 and securing the rocker arm against displacement axially of the shaft by means of a second nut 38 threaded onto the end portion of the shaft. Normally, the rocker arm 37 is biased in one direction for oscillation, as by means of a tension spring 40 (FIG. 9) to maintain the wiper blades 27 normally at one limit of the wiping stroke.

To oscillate the shaft 23 through a lens wiping stroke, the arm 37 is rocked in opposite to the biasing spring 40 and then permitted to return to its initial, normal position by return action of the spring 40. Means for effecting stroking actuation of the arm 37 are desirably constructed and arranged for operation from within the driver's compartment 17.

For this purpose, a flexible pull member 39 (FIGS. 8 and 9) on the order of a Bowden wire may be utilized suitably secured to the free end portion 41 of one of the arms 37 and guided as by means of a sheath 42 from adjacent to the floorboard 19 through which its rear end portion extends by way of an aperture (not shown). The rear end of the sheath 42 is anchored to the floorboard 19 by a clip assembly 43 and the rear end portion of the pull wire 39 is attached to one end portion of an actuating lever 44 which is suitably intermediately pivotally attached as by means of a pin 46 to a pump bracket 47 mounted on the floorboard 19 within the driver's compartment. At its opposite end, the actuating lever 44 is engageable with an actuating treadle 48 pivoted at 49 on the bracket 47 and accessible to the foot of the driver of the vehicle. On depression of the foot treadle 48 the actuating lever 44 is operated to pull rearwardly on the wire 39 whereby the arm 37 is rocked to turn the shaft 23 through one-half of a wiper blade stroke. Release of the treadle 48 enables the return spring 40 to complete the stroking oscillation of a wiper blade 27. Coordinated oscillation of the shafts 23 by simultaneous rocking of the associated arms 37 is effected by means of a tie rod 51 (FIGS. 1 and 9) pivotally connected at its respective opposite ends to the rocker arms 37.

Desirably, operation of the lens clearing system is accompanied by the depositing of a cleaning liquid on the headlight lenses 10 in coordination with the wiping strokes of the wiper blades 27. To this end, depression of the treadle 48 to operate the lever 44 also operates a cleaning liquid supply means which includes a pump 52 (FIG. 8) comprising a rubber bulb 53 supported by a dish-shaped base portion 54 of the bracket 47. Leading from the bulb 53 through the floorboard 19 is a fluid connection 56 for a flexible conduit 57 (FIG. 1) which is connected to a valve unit 58 carried by a fluid reservoir 59. The valve unit 58, in response to the operation of the treadle 48 provides for a flow of fluid from the reservoir 59 to the bulb 53, and from the bulb 53 to a conduit 61 connected to windshield nozzles 62, in the manner particularly described in Neufeld et al. patent 2,834,296. The conduit 61 is in a T-connection with a conduit 65 for supplying fluid to the headlight lenses 10. This supply conduit 65 has a pair of branch conduits 63, each of which is connected through a suitable nipple 64 (FIG. 3) with a longitudinal passage 66 formed in and open at the rear end of a shaft 23. The forward end of a passage 66 opens into a closed chamber 67 at the front end of a shaft 23. A pair of diametrically arranged nozzles 68 (FIGS. 3 and 4) carried on the shaft 23 in fluid communication with the chamber 67 direct fluid under pressure from the pump 52 onto adjacent pairs of headlight lenses 10, as indicated at 69 in FIG. 2, in the path of wiping movement of the blades 27.

It is seen, therefore, that on depression of the treadle 48 cleaning fluid is concurrently supplied to the windshield nozzles 62 and to the headlight nozzles 68. Additionally, on depression of the treadle 48, wiper blades 71 for the windshield 14 are set into operation simultaneously with the discharge of cleaning fluid onto the windshield. Thus as shown in FIG. 1 an electric wiper motor 72 mounted on the firewall 18 has a drive shaft 73 connected with a pair of wiper blades 71 (only one of which is shown) through a conventional transmission mechanism indicated at 74. A hand operated switch 76 carried on an instrument panel 77 operates the motor 72 independently of the pump assembly 52.

To operate the motor 72 in response to the operation of the pump 52 to supply fluid under pressure to the nozzles 62 and 68 an electrical switch unit 78, electrically associated with the wiper motor 72 (FIG. 2) is mounted on the bracket 47 at the end thereof remote from the bulb 53 so that the pivot 49 for the treadle 48 is located between the bulb 53 and the switch unit 78. An extension 79 on the treadle 48 is cooperatively engageable with a push button actuator 81 for the switch unit 78. When the treadle 48 is in its released position shown in FIG. 8 the push button 81 is depressed by the extension 79 to stop the motor 72 and provide for the movement of the windshield wipers 71 to a parked position therefor. On depression of the treadle 48, to supply fluid under pressure to the nozzles 62 and 68, the push button 81 is released by the treadle extension 79 to provide for the operation of the wiper motor 72. This operation of the motor 72 by the switch unit 78 takes place independently of the hand operated motor switch unit 76. For a detailed description of the electrical circuitry for the motor 72 and switch units 76 and 78 reference is made to Webb Patent 2,970,335.

As previously mentioned the nozzles 68 for the headlight lenses 10 direct fluid under pressure into the path of wiping movement of the headlight wiper blades 27. In this wiping action it is desirable that the fluid discharged from the nozzles 68 be in a leading relation with the blades 27 in both directions of their oscillating movements.

Referring to FIG. 6 it is seen that the opening 31 for receiving the pin 29, which pivotally connects the wiper arms 26 on the shaft 23, is of an hourglass shape transversely of the shaft 23. The shaft 23 is thus permitted to rock in opposite directions with a lost motion relative to the pin 29. In other words on rotation of the shaft 23 in a clockwise direction, from its position in FIG. 6, the pin 29 and in turn the wiper arms 26, will remain stationary until the pin 29 is engaged by the side wall portions 82 of the opening 31, as shown in FIG. 5. In like manner when the shaft 23 is rotated in a counterclockwise direction from its position in FIG. 6 the pin 29 and wiper arms 26 remain stationary until the pin is engaged by the opening side wall portions 83 as shown in FIG. 7. The junctions 84 between the side wall portions 82 and 83 thus function as bearing fulcrum points 84 on the shaft 23 relative to the pin 29 during the lost motion travel of the shaft.

It is to be noted that this lost motion travel of the shaft 23 takes place after each oscillation of a blade 27, namely, after a blade 27 has completed an oscillation in one direction and the shaft 23 is being reversed to move or oscillate a blade 27 in an opposite direction.

With the nozzles 68 carried on the shaft 23 so as to extend outwardy therefrom in a plane substantially normal to the axis of the pin 29, when the pin is in its position of FIG. 6 centered within the shaft opening, lost motion of the shaft 23, relative to the pin 29 moves the nozzles 68 to direct a stream of fluid in a leading relation with their corresponding blades 27, as clearly appears in FIGS. 5 and 7. It is to be understood that during a wiping action by the blades 27, the pin 29 will be in one or the other of its positions shown in FIGS. 5 and 7.

There is thus provided a headlight washing system wherein, in response to the operation of the foot treadle 48, cleaning fluid is supplied to the headlight lenses 10 and windshield 14 concurrently with an operation of the headlight wipers 27 and the windshield wiper 71. Additionally a leading of the headlight nozzles 68 relative to their corresponding wiper blades 27 is automatically effected at the beginning of each oscillation of the blades.

We claim:

1. A cleaning system for the headlight lens of a vehicle having a driver's compartment and a front end portion for mounting a headlight having a lens:
    (a) an oscillatable shaft mounted on said front end portion alongside said headlight and having an arm projecting laterally therefrom over said headlight lens;
    (b) a wiper blade on said arm for engaging said lens,
    (c) actuating means operable from within said driver's compartment and having an operating connection with said shaft for oscillating said shaft and arm to effect wiping strokes of said wiper blade over said lens, (d) means for supplying a cleaning liquid onto said lens concurrently with the actuation of said wiper blade, said liquid supply means including a passage means formed in said shaft having a liquid discharge orifice opening adjacent to said arm to direct liquid toward said lens, and (e) a lost motion connection between said arm and oscillatable shaft to provide for the liquid from said orifice opening being directed in a leading relation with said wiper blade for each oscillating movement thereof.

2. A cleaning system for the headlight lens of a vehicle as defined in claim 1, in which:

(a) each of said headlights is one of a set of dual headlights, (b) said shafts each carrying an additional arm and a wiper blade mounted thereon whereby to simultaneously wipe the dual headlight lenses in each set, and (c) means for coordinating the oscillations of said oscillatable shafts in response to the operation of said actuating means.

3. A vehicle dual headlight lens cleaning system comprising:

(a) dual wiper blade means including supporting structure therefor, (b) oscillatable means mounting the supporting structure adjacent to the dual headlights with the wiper blade means in wiping engagement with the headlight lenses, (c) means for oscillating said oscillatable means and thereby said arm structure to move said wiper blade means back and forth in wiping strokes over said lenses, and (d) means operable by a driver of the vehicle for actuating said oscillating means.

4. A vehicle dual headlight cleaning system as defined in claim 3 including:

(a) means for supplying a cleaning liquid onto said lenses in response to the operation of said driver operated means.

5. A cleaning system for a pair of headlights and windshield of a vehicle including:

(a) wiper means for said windshield, (b) nozzles for directing a cleaning fluid against said windshield in the path of movement of said wiper means, (c) a motor for said wiper means, (d) a wiper assembly for each headlight including a wiper blade, (e) a pair of oscillatable shafts corresponding to said headlights, each shaft positioned alongside of a corresponding headlight, (f) means mounting a wiper assembly on each shaft with the wiper blade thereof engageable with the lens of a corresponding headlight, (g) each shaft having a passage means therein open to the rear end of the shaft and an orifice in fluid communication with the passage means for directing a cleaning fluid against the lens of a corresponding headlight, (h) means connecting said shafts for simultaneous oscillation, (i) actuating means operable to oscillate said shafts, (j) control means for the motor of said wiping means, (k) means for supplying a cleaning fluid under pressure to said nozzles and to the rear ends of said passage means including a pump assembly, and (l) an actuating member operable by the vehicle operator and common to said actuating means, control means and pump assembly, whereby on operation of said actuating member cleaning fluid is supplied to said nozzles and shafts concurrently with the operation of said wiper means and wiper assemblies.

6. A cleaning system for the headlight lens of a vehicle having a driver's compartment and a front end portion for mounting a headlight adjacent each side of said front end portion:

(a) an oscillatable shaft corresponding to each headlight mounted on said front end portion alongside of a corresponding headlight;

(b) each shaft having an arm projecting laterally therefrom over the lens of a corresponding headlight;

(c) a wiper blade on each arm for engaging a corresponding headlight lens; and (d) actuating means operable from within the driver's compartment having an operating connection with each shaft for oscillating said shafts and arms to effect a wiping stroke of each wiper blade over a corresponding headlight lens.

References Cited

UNITED STATES PATENTS

| | | | |
|---|---|---|---|
| 2,271,225 | 1/1942 | Heffernan | 15—250.01 |
| 2,970,335 | 2/1961 | Webb | 15—250.02 |
| 3,117,727 | 1/1964 | Pollock et al. | 15—250.01 |
| 3,153,253 | 10/1964 | Neufeld et al. | 15—250.02 |
| 3,171,155 | 3/1965 | Kibler | 15—250.02 |
| 3,289,237 | 12/1966 | Lindsey | 240—7.1 XR |

FOREIGN PATENTS 676,967  12/1963  Canada.

BILLY J. WILHITE, Primary Examiner
ROBERT I. SMITH, Assistant Examiner